United States Patent [19]

Babitzka

[11] Patent Number: 4,944,486

[45] Date of Patent: Jul. 31, 1990

[54] ELECTROMAGNETICALLY ACTUATABLE VALVE AND METHOD FOR ITS MANUFACTURE

[75] Inventor: Rudolf Babitzka, Birkenweg, Fed. Rep. of Germany

[73] Assignee: Robert Bosch GmbH, Stuttgart, Fed. Rep. of Germany

[21] Appl. No.: 362,782

[22] Filed: Jun. 7, 1989

[30] Foreign Application Priority Data

Jul. 23, 1988 [DE] Fed. Rep. of Germany ....... 3825134

[51] Int. Cl.[5] .............................................. F16K 31/06

[52] U.S. Cl. .......................... 251/129.21; 251/129.15; 239/585

[58] Field of Search ....................... 251/129.21, 129.15; 239/585

[56] References Cited

U.S. PATENT DOCUMENTS 3,446,246 5/1969 Huley ......................... 251/129.21 X 3,837,618 9/1974 Juhel .............................. 251/129.15

4,564,145 1/1986 Takada et al. ...................... 239/585

4,670,808 9/1986 Hensley .

FOREIGN PATENT DOCUMENTS 1055490 1/1969 United Kingdom ........... 251/129.15

*Primary Examiner*—Arnold Rosenthal

*Attorney, Agent, or Firm*—Edwin E. Greigg

[57] ABSTRACT

In known electromagnetically actuatable valves having a connection fitting acting as a core and on which a magnet coil is disposed, the magnet coil is surrounded by a solid valve housing of ferromagnetic metal. The manufacture of this valve housing is very labor-intensive and results in undesirably large external dimensions. The novel embodiment of the valve enables not only simple manufacture but also a reduction in the external dimensions of the valve. In the novel valve, a plastic sheath surrounding both the connection fitting and the magnet coil is provided, which at least in the region surrounding the magnet coil contains ferromagnetic fillers conducting magnetic field lines. The fillers surround the magnet coil in the circumferential direction. This embodiment of the valve is suitable for electromagnetically actuatable systems of all kinds.

12 Claims, 1 Drawing Sheet

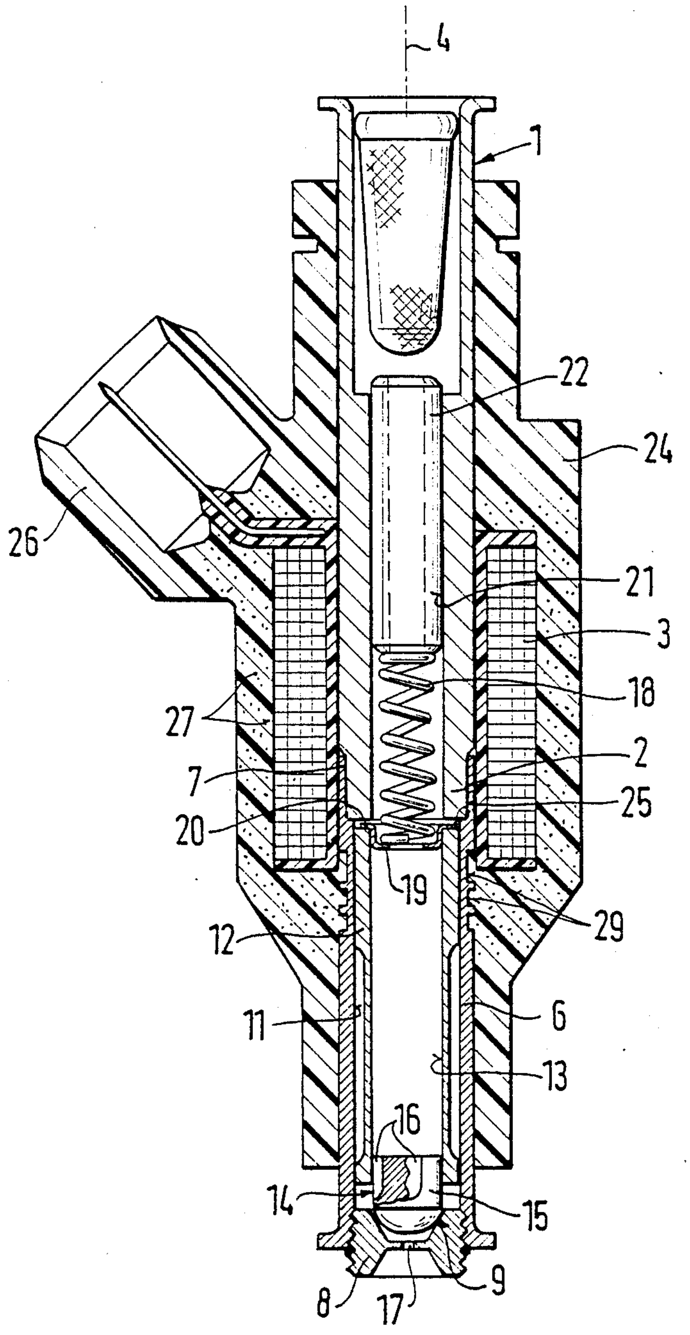
4
1
22
24
26
21
3
27
18
2
7
25
20
19
29
12
6
11
13
16
14
15
8
17
9

ELECTROMAGNETICALLY ACTUATABLE VALVE AND METHOD FOR ITS MANUFACTURE

BACKGROUND OF THE INVENTION

The invention is directed to improvements in electromagnetically actuatable valves and in methods for manufacturing them.

In a known electromagnetically actuatable valve (U.S. Pat. No. 4,610,080), the magnet coil is surrounded by a metal valve housing of ferromagnetic material, for conducting the magnetic field lines. This is not only very costly because the manufacture of the metal housing is labor-intensive, but the valve also has a large diameter and is undesirably heavy, because for static reasons the wall of the valve housing is made thicker than is necessary for conducting the magnetic field lines. An intermediate part made of plastic is also disposed in the known valve between the valve housing and the valve seat body, which entails the risk that from thermal expansion or swelling of the plastic, the intermediate part might shift in position in such a way that the valve needle could jam, or the intended valve needle stroke between the armature and the core changes in some undesirable way.

OBJECTS AND SUMMARY OF THE INVENTION

It is a principal object of the invention to provide a valve which has the advantage over the prior art that the outer contour of the valve is simple to adapt to requirements at the location where the valve is to be installed.

It is another object of the invention that the valve can be manufactured simply, at a favorable cost and with smaller circumferential dimensions, while assuring that the requirements for operational reliability of the valve are met.

It is still another object of the invention to provide plastic sheathing allowing for adequate dissipation of heat outward from the interior, so that even copper can be used as the material for the magnet coil winding, which results in smaller dimensions compared with a brass winding. The improved dissipation helps avoid fuel evaporation.

It is yet another object of the invention to provide a tubular metal intermediate part, which serves to guide the armature, disposed between the valve seat body and an end facing the armature of the connection fitting core.

Still another object of the invention is that the intermediate part is made of nonmagnetic material and provided with a guide bore to guide the armature, and that at least two annular grooves, axially spaced apart from one another, are provided in this region guiding the armature. This feature makes a very slender, rigid connection possible between the connection fitting and the valve seat body. Moreover, it results in narrow air gaps for the magnetic circuit.

Yet an additional object of the invention is that the armature can be made tubular and as thin-walled as possible on its extremity oriented toward the valve closing body, resulting in the smallest possible masses that must be moved by the electromagnetic field.

Indeed another object of the invention is that the excitation of the magnet coil, at least during the phase in which the plastic sheathing sets, causes an advantageous alignment of the fillers having ferromagnetic properties.

In the novel valve, a plastic sheath surrounding both the connection fitting and the magnet coil is provided, which at least in the region surrounding the magnet coil contains ferromagnetic fillers conducting magnetic field lines. The fillers surround the magnet coil in the circumferential direction. This embodiment of the valve is suitable for electromagnetically actuatable systems of all kinds.

The invention will be better understood and further objects and advantages thereof will become more apparent from the ensuing detailed description of a preferred embodiment taken in conjunction with the drawing.

BRIEF DESCRIPTION OF THE DRAWING

The sole FIGURE of the drawing shows an exemplary embodiment of the invention in simplified form.

DESCRIPTION OF THE PREFERRED EMBODIMENT

The electromagnetically actuatable valve shown in the drawing, by way of example in the form of a fuel injection valve as part of a fuel injection system in a mixture-compressing internal combustion engine with externally supplied ignition, has a tubular metal connection fitting 1 of ferromagnetic material, with a magnet coil 3 disposed on the lower core end 2 of the fitting. The connection fitting 1 thus serves as a core at the same time. An intermediate part 6 is connected tightly, for instance by soldering or welding, to the connection fitting 1, adjoining its core end 2, concentrically with the longitudinal axis 4 of the valve. The intermediate part 6 is manufactured from nonmagnetic metal and fits around the core end 2, for instance with a collar 7. Remote from the connection fitting 1, a metal valve seat body 8, which has a fixed valve seat 9 oriented toward the core end 2 of the connection fitting 1, is connected to the intermediate part 6. The connection between the intermediate part 6 and the valve seat body 8 is likewise embodied tightly, for instance by screw means, welding or soldering. The lining up of the connection fitting 1, intermediate part 6 and valve seat body 8 forms a rigid metal unit. The intermediate part 6 is tubular and has a coaxial guide bore 11, into which an armature 12 extends. The armature 12 is guided during its displacement motion by the guide bore and is tubular. Disposed in an inner bore 13 of the armature 12, on its end toward the valve seat 9, and connected to it, is a valve closing body 14, which may for instance be in the form of a cylindrical segment 15 with a hemispherical end, or some other form. Flattened faces 16 leading outward are provided on the circumference of the cylindrical segment 16 of the valve closing body 14, by way of which faces fuel flowing in from the connection fitting 1, flowing through the armature 12 on the inside, can flow out of the inner bore 13 to reach the valve seat 9, downstream of which at least one injection port 17 is embodied in the valve seat body 8.

Remote from the valve closing body 14, a restoring spring 18 protrudes into the inner bore 13 of the armature 12, supported for instance on one end on a cup-shaped spring plate 19 in the inner bore 13. The spring plate 19 rests with a collar 20 on an armature end face 25 oriented toward the core end 2, and in the excited state of the magnet coil 3 forms a residual air gap between the core end 2 and the armature end face 25. The other end of the restoring spring 18 protrudes into a flow bore 21 of the connection fitting 1, where it rests on a tubular adjusting sleeve 22, which serves to adjust the spring tension. At least part of the connection fitting 1 and the entire axial extent of the magnet coil 3 are surrounded by a plastic sheath 24, which also surrounds at least part of the intermediate part 6. The plastic sheath 24 can be made by compound filling or extrusion coating with plastic. An electric connection plug 26, by way of which the electrical contact of the magnet coil 3 and hence its excitation are effected, is also formed onto the plastic sheath 24. At least in the portion of the plastic sheath 24 surrounding the magnet coil 3, fillers 27 that conduct the magnetic field lines are provided, which are of ferromagnetic material and are represented by dots in the drawing. As the fillers 27, possible materials that can be used are fine-grained, comminuted parts made of metals having soft-magnetic properties. For better alignment of the fillers 27, it is suitable for the the magnet coil 3 to be excited either during the phase of making the plastic sheath 24 by extrusion coating or compound filling, and/or during its setting phase.

On its circumference, in the region guiding the armature, the intermediate part 6 has at least two annular grooves 29, which are axially spaced apart from one another, and which despite the formation of the smallest possible air gap for the magnetic circuit nevertheless assure an adequate rigidity of the intermediate part 6.

The plastic sheath described herein makes a compact, slender valve construction possible, which enables simple manufacture at favorable cost.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An electromagnetically actuatable fuel injection valve for fuel injection systems in internal combustion engines, comprising a ferromagnetic, metal connection fitting serving as a core extending along a longitudinal axis of the valve, a magnet coil being disposed on the connection fitting, an armature being disposed adjacent said magnet coil and provided with a valve closing body (14), a metal valve seat body (8) including a fixed valve seat (9), said magnetic coil being adapted to actuate said armature and thereby said valve closing body with respect to said fixed valve seat (9), a plastic sheath surrounding at least a portion of the connection fitting and all of the magnet coil (3), and said plastic sheath includes fillers (27) having ferromagnetic properties adapted to conduct magnetic field lines provided within at least that portion of the plastic sheath (24) surrounding the magnetic coil (27).

2. A valve as defined by claim 1, in which a tubular metal intermediate part (6) extending toward the metal valve seat body (8) is connected to a core end (2), of the connection fitting (1) oriented toward the armature (12).

3. A valve as defined by claim 2, in which the intermediate part (6) is manufactured of nonmagnetic material and has a guide bore (11) for guiding the armature (12).

4. A valve as defined by claim 3, in which the intermediate part (6) is connected to the metal valve seat body (8).

5. An electromagnetically actuatable fuel injection valve for fuel injection systems in internal combustion engines, comprising a ferromagnetic, metal connection fitting serving as a core extending along a longitudinal axis of the valve, a magnet coil being disposed on the connection fitting, an armature being disposed adjacent said magnet coil and provided with a valve closing body (14), a metal valve seat body (8) including a fixed valve seat (9), said magnetic coil being adapted to actuate said armature and thereby said valve closing body with respect to said fixed valve seat (9), a tubular intermediate part (6) made of nonmagnetic material extends toward the metal valve seat body (8) and is connected to a core end (2), of the connection fitting (1) oriented toward the armature (12), said intermediate part (6) of nonmagnetic material has a guide bore (11) for guiding the armature (12) and is connected to the metal valve seat body (8), said armature (12) is tubular in embodiment and is connected on its extremity oriented toward the valve seat (9) with the valve closing body (14), and a plastic sheath surrounds at least a portion of the connection fitting and all of the magnet coil (3), and said plastic sheath includes fillers (27) having ferromagnetic properties adapted to conduct magnetic field lines provided within at least that portion of the plastic sheath (24) surrounding the magnetic coil (27).

6. A valve as defined by claim 5, in which the valve closing body (14) has a cylindrical segment (15) protruding partway into an inner bore (13) of the armature (12) and has flattened faces (16) provided on a circumferential wall thereof, said faces extending outwardly from the inner bore (13) substantially along the longitudinal axis (4) of the valve.

7. A valve as defined in claim 5, in which a wall of the armature oriented toward the valve closing body is made as thin as possible to reduce mass of the armature.

8. An electromagnetically actuatable fuel injection valve for fuel injection systems in internal combustion engines, comprising a ferromagnetic, metal connection fitting serving as a core extending along a longitudinal axis of the valve, a magnet coil being disposed on the connection fitting, an armature being disposed adjacent said magnet coil and provided with a valve closing body (14), a metal valve seat body (8) including a fixed valve seat (9), said magnetic coil being adapted to actuate said armature and thereby said valve closing body with respect to said fixed valve seat (9), a tubular metal intermediate part (6) made of nonmagnetic material extends toward the metal valve seat body (8) and is connected to a core end (2) of the connection fitting (1) oriented toward the armature (12), said intermediate part (6) has a guide bore (11) for guiding the armature (12) and is provided with at least two annular grooves (29), spaced apart axially from one another, on a circumferential wall thereof in the region adapted to guide the armature, said intermediate part (6) is connected to the metal valve seat body (8), and a plastic sheath surrounding at least a portion of the connection fitting and all of the magnet coil (3), and said plastic sheath includes fillers (27) having ferromagnetic properties adapted to conduct magnetic field lines provided within at least that portion of the plastic sheath (24) surrounding the magnetic coil (27).

9. A valve as defined by claim 8, in which the armature (12) is tubular in embodiment and is connected on its extremity oriented toward the valve seat (9) with the valve closing body (14).

10. A valve as defined by claim 9, in which the valve closing body (14) has a cylindrical segment (15) protruding partway into an inner bore (13) of the armature (12) and has flattened faces (16) provided on a circumferential wall thereof, said faces extending outwardly from the inner bore (13) substantially along the longitudinal axis (4) of the valve.

11. A valve as defined by claim 8, in which a wall of the armature oriented toward the valve closing body is made as thin as possible to reduce a mass of the armature.

12. A valve as defined by claim 9, in which a wall of the armature oriented toward the valve closing body is made as thin as possible to reduce a mass of the armature.

* * * * *